United States Patent
Ledesma et al.

(10) Patent No.: US 11,668,432 B1
(45) Date of Patent: Jun. 6, 2023

(54) SECURE BASE FOR ELECTRIC VEHICLE CHARGING STATION

(71) Applicant: FREEWIRE TECHNOLOGIES, INC., Newark, CA (US)

(72) Inventors: Christopher Ledesma, San Leandro, CA (US); James Crim, San Francisco, CA (US)

(73) Assignee: FREEWIRE TECHNOLOGIES, INC., Newark, CA (US)

( * ) Notice: Subject to any disclaimer, the term of this patent is extended or adjusted under 35 U.S.C. 154(b) by 0 days.

(21) Appl. No.: 17/952,082

(22) Filed: Sep. 23, 2022

(51) Int. Cl.
*F16M 11/22* (2006.01)

(52) U.S. Cl.
CPC ......... *F16M 11/22* (2013.01); *F16M 2200/08* (2013.01)

(58) Field of Classification Search
USPC ................ 248/346.01, 346.02, 346.4, 346.5; 108/51.11, 52.1, 55.3, 57.17, 57.18, 108/57.22, 57.21, 57.23, 57.24, 57.29, 108/57.3, 57.31, 57.32; 312/278
See application file for complete search history.

(56) References Cited

U.S. PATENT DOCUMENTS

| | | | | |
|---|---|---|---|---|
| 6,173,658 B1* | 1/2001 | Moberg | ............. | B65D 19/0016 108/52.1 |
| 6,839,952 B2* | 1/2005 | Hamilton | ........... | B65D 19/0095 108/57.17 |
| 8,061,672 B1* | 11/2011 | Kaufman | .................. | E04B 2/82 248/228.3 |
| 2012/0000399 A1* | 1/2012 | Aden | ................. | B65D 19/0026 108/51.11 |
| 2014/0345501 A1* | 11/2014 | Lundius | ............. | B65D 19/0095 108/51.11 |
| 2015/0040803 A1* | 2/2015 | Burk | .................. | B65D 19/0038 108/57.29 |

\* cited by examiner

*Primary Examiner* — Alfred J Wujciak
(74) *Attorney, Agent, or Firm* — Marshall, Gerstein & Borun LLP

(57) ABSTRACT

A secure base for a large piece of equipment, such as an electric vehicle charging station, includes a plurality of identical beam members having a generally rectangular-tubular shape, secured in a parallel arrangement to an underside of a baseplate. Each of the beam members includes a pair of opposing elongate openings defined by a bottom wall and sidewalls of the beam member. The beam members may be enclosed by kickplates secureable about a perimeter of the base. The preferred arrangement of the beam members, and the elongate openings therein, allow for receipt of blades of a forklift or pallet jack from all four sides of a piece of equipment mounted on the base.

9 Claims, 11 Drawing Sheets

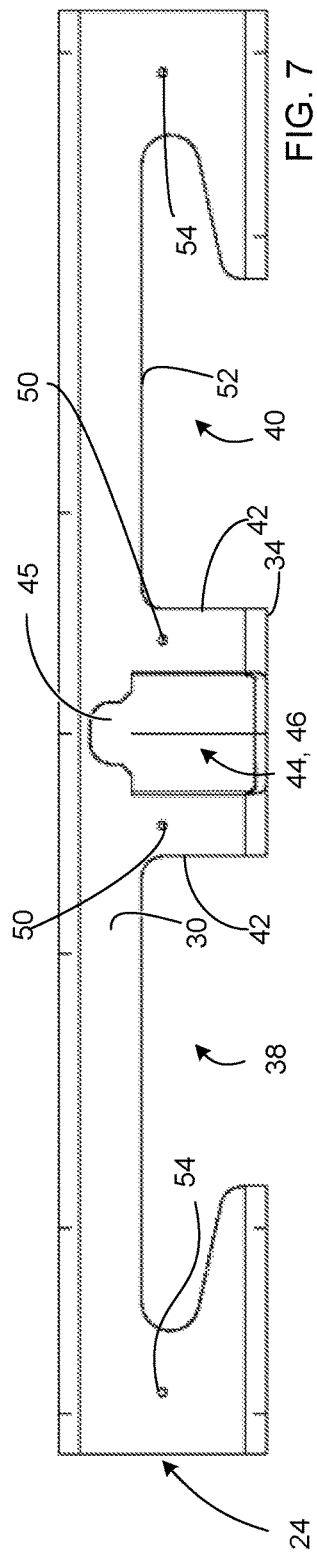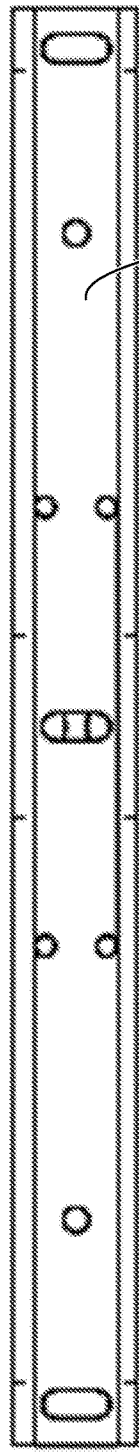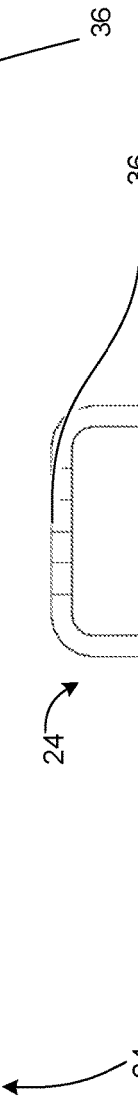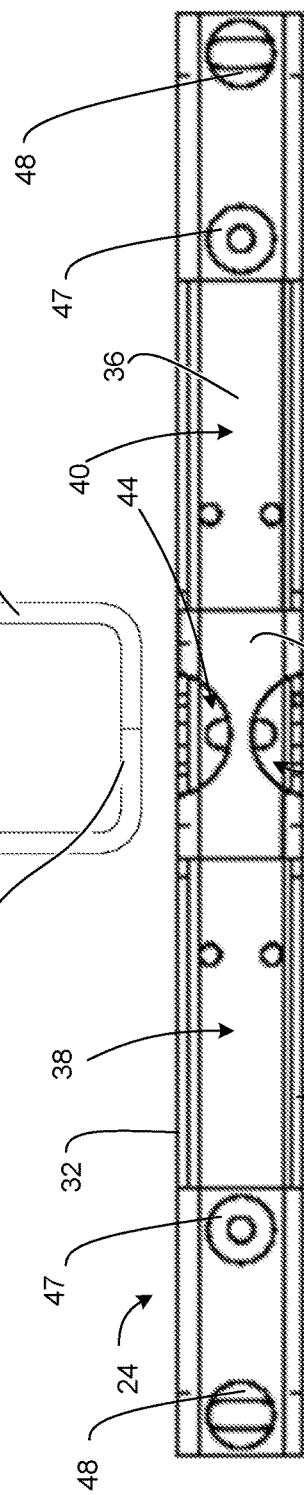

SECURE BASE FOR ELECTRIC VEHICLE CHARGING STATION

FIELD OF THE DISCLOSURE

This disclosure relates generally to structural platforms for securing equipment in outdoor environments to the ground, and more specifically, to a combination of beam members that form a secure base to which an electrical charging station is mounted.

BACKGROUND

Electric vehicle charging stations are heavy, costly and sophisticated equipment and are typically deployed in outdoor locations where they are, in large part, exposed to the elements and potentially vulnerable to tampering or theft. While it has been known to employ anchor bolts to secure charging stations to the ground, there is a need for a reliable and easy to install system to dependably secure electric vehicle charging stations to the ground.

SUMMARY OF THE DISCLOSURE

The secure base of the present disclosure includes a combination of uniform beam members arranged into a configuration that facilitates transportation and installation of electric vehicle charging stations. Each beam member is preferably made of a durable, high-strength material, such as steel, and has a generally rectangular tubular open-ended shape. The sidewalls and bottom of each of the beam members define elongate opposing openings, preferably laser cut into a length of rectangular tube steel, each having a profile that may be described as generally anvil-horn shaped. Heel ends of the elongate opposing openings extend vertically from the bottom of the beam member and are spaced apart and separated from one another by a pair of laterally outwardly-open central opposing semi-cylindrical openings at a midpoint of the beam member. Each of the semi-cylindrical openings may have a crown-like top, similar in profile to a shouldered and flat-topped derby hat or resembling in profile that of a flat-topped cap nut. Two pairs of additional, preferably circular, apertures are provided in the bottom of the beam member, with one such aperture of each of the pairs provided below a toe region of a respective one of the elongate opposing openings.

Each of the sidewalls of each of the beams preferably includes mounting holes therein, with at least one such mounting hole preferably located in each sidewall portion between the vertical portions of the heel ends of the elongate openings and the central semi-cylindrical opening, just below an upper flat surface of the elongate openings. Additional mounting holes may be provided in each sidewall between the toe ends of the elongate openings and the respective ends of the beam. The mounting holes are sized to receive a fastener, such as a fastening bolt, to secure a frame panel, or kick plate, to a beam located along an edge of a perimeter of the charging station.

In a preferred embodiment, four such beam members are arranged parallel to one another and secured to the underside of a rigid baseplate, such as with a combination of conventional flat-headed bolts and right angle projection threaded studs (also known as 90° anchor bolts or L-shaped bolts) received through additional mounting holes provided in a top wall of each of the beam members. A first of the beam members may be provided and so secured along a front of the baseplate. A second of the beam members may be provided and so secured along a rear of the baseplate. The third and fourth beam members may be provided and so secured in close proximity to one another, adjacent a midline of the baseplate and parallel to the first and second beam members.

The aligned beam members and baseplate serve as an integral pallet, with the elongate openings of the plurality of beam members acting as notches in a pallet, in that they receive forks or blades of a forklift, or of a pallet jack, to lift and transport an electric charging station secured to the baseplate. The arrangement of the aligned beam members also facilitates receipt of forklift or pallet jack blades in a direction parallel to the orientation of the aligned beam members, each blade being received between one of the outer two beam members and a respective one of the inner two beam members. This ease of access from any of four sides of a large piece of equipment, such as an electric vehicle charging station, provided on the base provides improved maneuverability of equipment, particularly in locations where access may be more limited in some directions than others, such as where there is only sufficient room for a pallet jack next to, but not in front of or behind, a piece of equipment mounted on the base.

In a preferred embodiment, a pair of side kick plates is provided, one along each side of the array of beam members, each side kick plate having a main wall, and at each end of the main wall, there is provided an inwardly-stepped tongue-receiving wall portion that extends parallel to the main wall, and a securement tab perpendicular to the tongue-receiving wall portion. The securement tab may include a mounting hole that is at a vertical position and spaced from the inwardly-stepped tongue-receiving wall portion a distance so as to align with a corresponding mounting hole of one of the outer beam members, i.e. a mounting hole in a sidewall of one of the beam members provided along the front or rear of the baseplate. Each of the front and rear kick plates has a main wall and at each longitudinal end thereof, a side tongue extends perpendicularly to the main wall. The main wall of each of the front and rear kick plates is preferably provided with a pair of countersunk regions, preferably circular in shape, each surrounding a central bore that aligns with a respective one of the mounting holes in the outer beam members, i.e., the mounting hole in a sidewall of one of the beam members provided along the front or rear of the baseplate, between the heel end of one of the elongate openings and the central semi-cylindrical opening. When mounted to the front or rear beam member, the side tongues of the front or rear kick plate are received over respective inwardly-stepped tongue-receiving walls of the side kick plates. The kick plates not only provide a cosmetic cover to obscure visibility of the beam members, but also serve to secure the equipment mounted on the base and connections, such as power cables, on an underside of such equipment. Bolts used to secure the kick plates to the beam member may be provided with secure bolts, with heads requiring non-standard tools.

Each of the front and rear kick plates can be further provided with one or more punch-outs or openings to facilitate conduit, such as a power supply cable, Ethernet cable, or the like, to pass through the kick plate and into a protected enclosure.

BRIEF DESCRIPTION OF THE SEVERAL VIEWS OF THE DRAWING

FIG. 7 is a front elevation view of the beam member of FIG. 6;

FIG. 8 is a top view of the beam member of FIG. 6;

FIG. 9 is a side elevation or end view of the beam member of FIG. 6;

FIG. 10 is a bottom view of the beam member of FIG. 6;

DETAILED DESCRIPTION OF THE PREFERRED EMBODIMENTS

Figure 1:
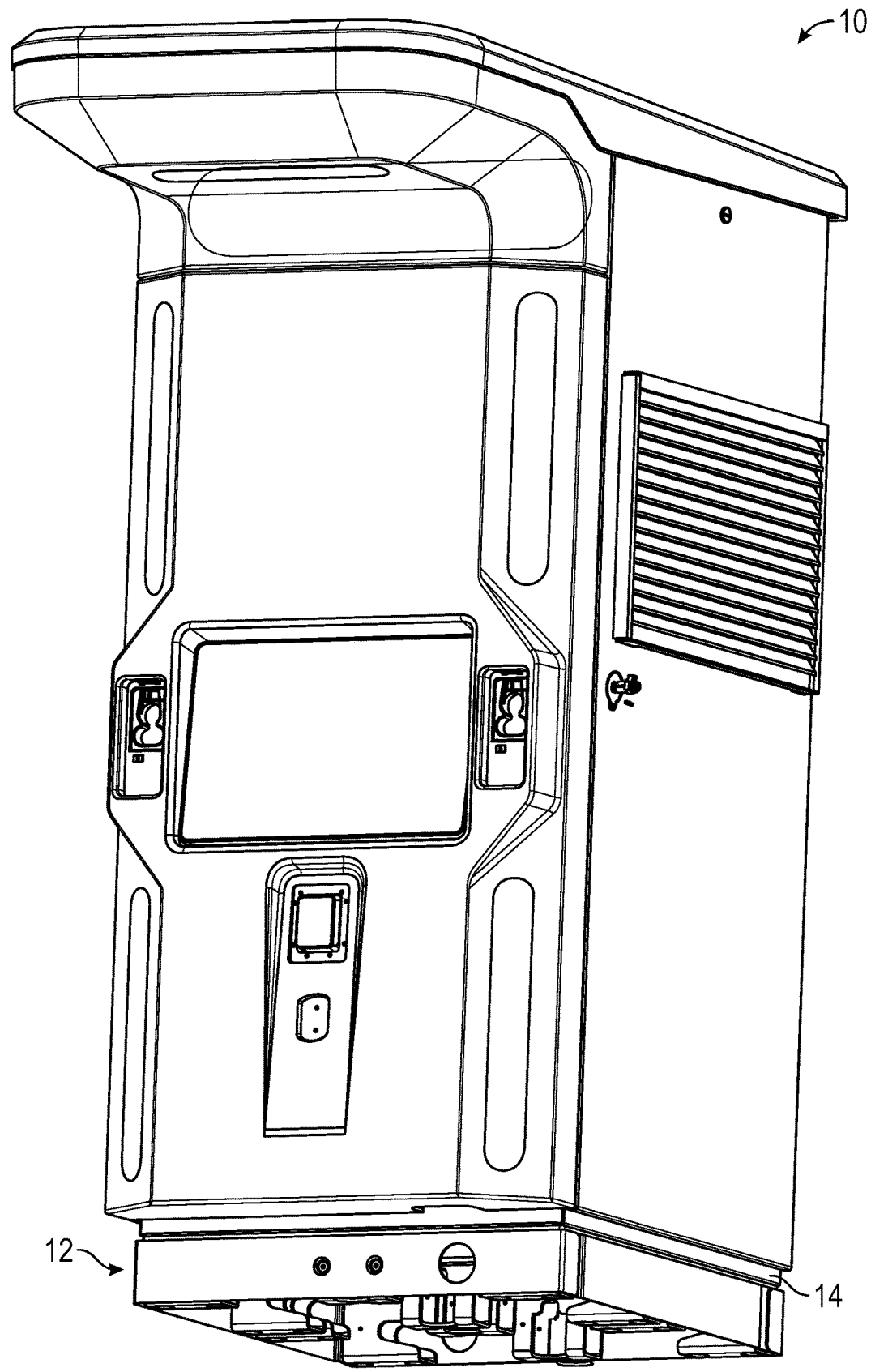
FIG. 1 is a perspective view of an electric vehicle charging station on a secure base of the present disclosure.
Figure 2:
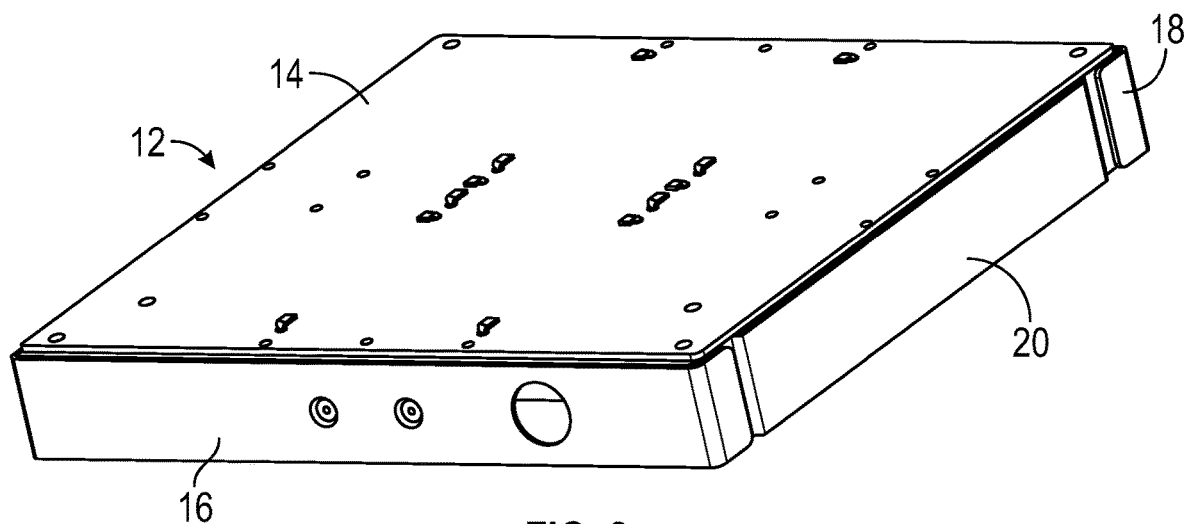
FIG. 2 is a top, front, right perspective view of a secure base of the present disclosure, with a baseplate secured atop thereof.
Figure 3:
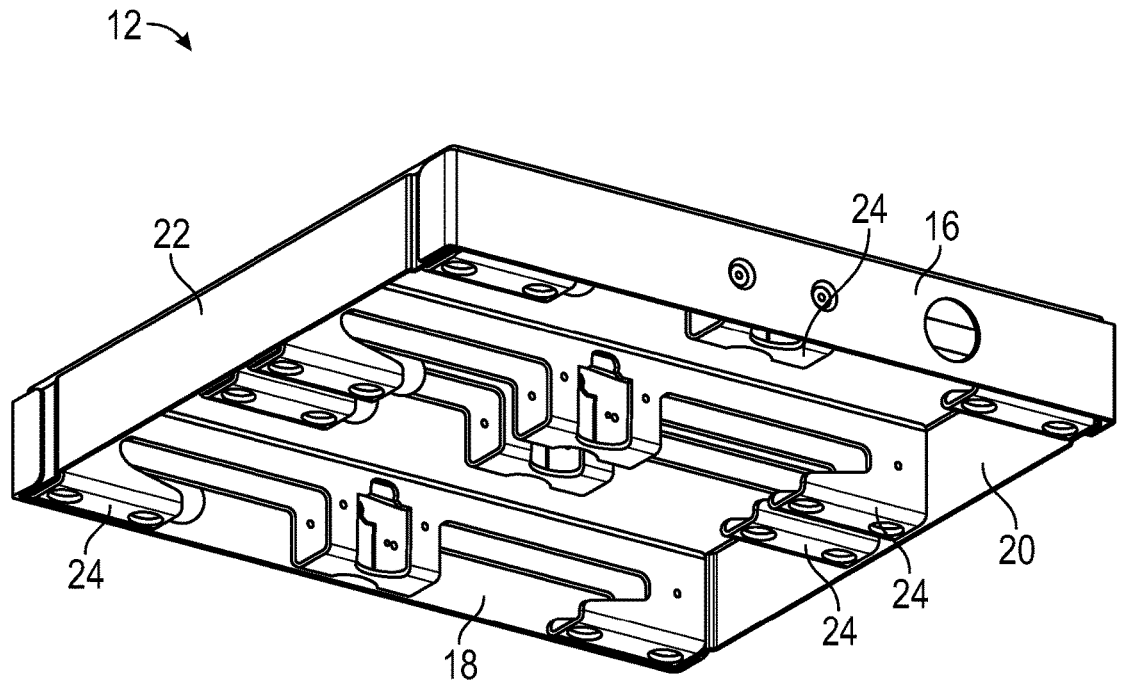
FIG. 3 is a bottom, front, left perspective view of the secure base and baseplate of FIG. 2.
Figure 4:
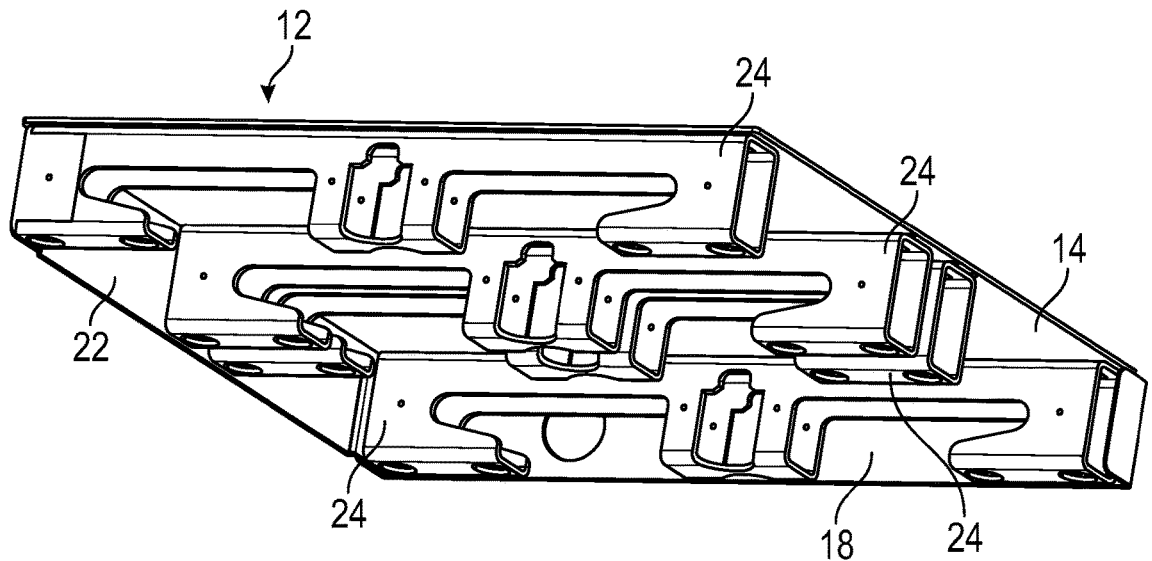
FIG. 4 is a bottom, front, right perspective view of the secure base and baseplate of FIG. 2, with a front kick plate and a right side kick plate removed.
Figure 5:
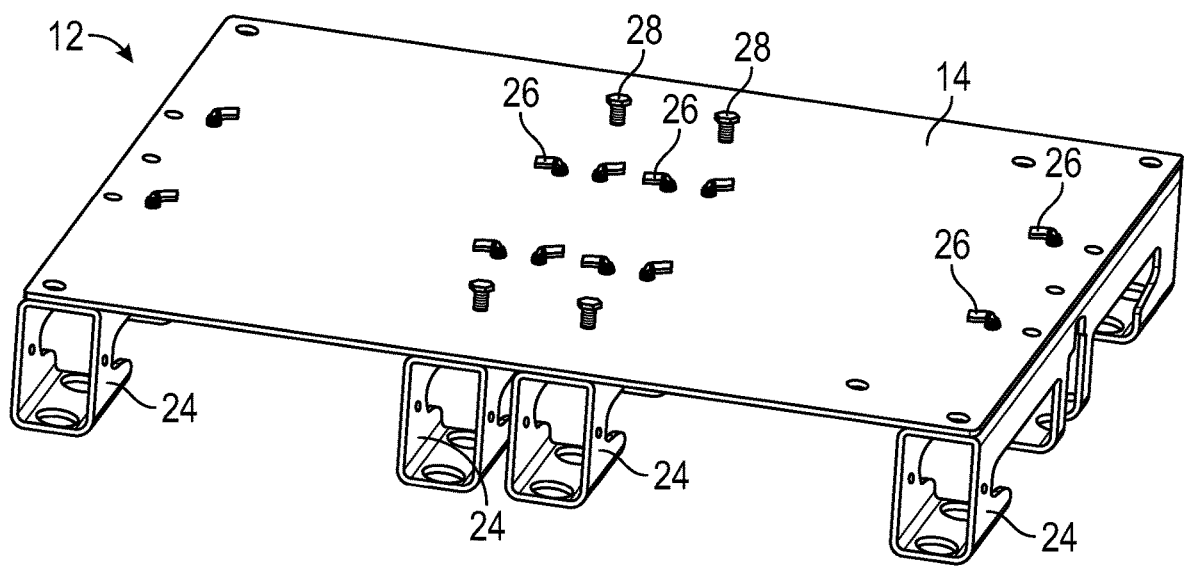
FIG. 5 is a top, left, front perspective view of the secure base and baseplate of FIG. 2, with front, rear, left side, and right side kick plates removed.
Figure 6:
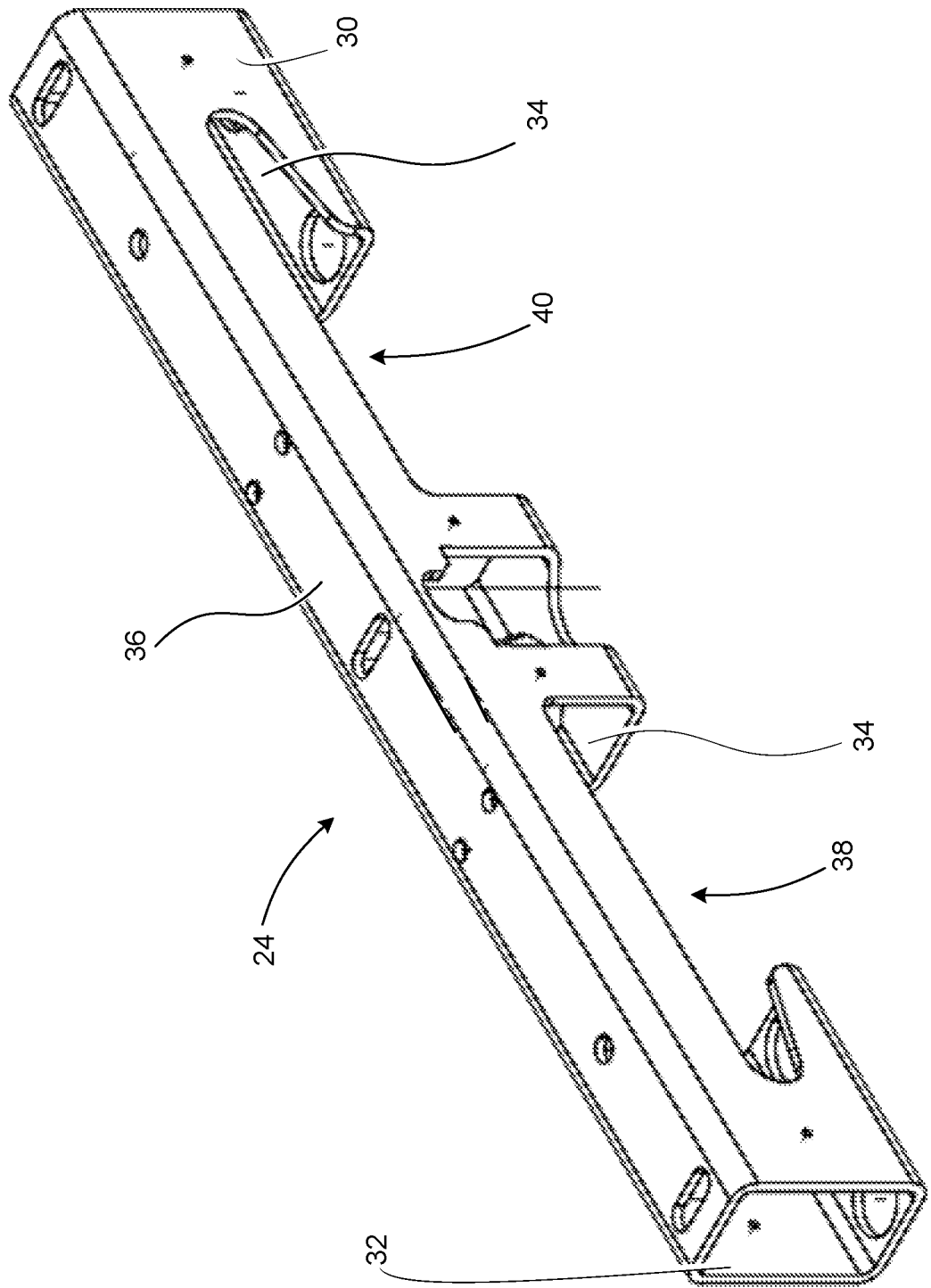
FIG. 6 is a top perspective view of a beam member of the secure base of the present disclosure.

With reference to FIG. 1, an electric vehicle charging station 10 is provided with a secure base generally designated as 12 with components extending below, and fastened to, a baseplate 14, which baseplate 14 may be considered part of the secure base 12. Turning to FIGS. 2 and 3, the secure base 12 includes front and rear kick plates 16, 18, and side kick plates 20, 22. The kick plates 16, 18, 20, and 22 serve a cosmetic purpose, but also serve to protect the secure base 12 from ingress of debris, pests, and moisture, and serve as a tamper/theft deterrent.

The secure base 12 is primarily composed of a plurality (preferably four) of beam members 24. For ease of manufacturing, assembly, and use, the beam members 24 are preferably identical to one another. As illustrated in FIGS. 2 through 5, the beam members 24 are secured to the baseplate 14 by a plurality of fasteners 26, 28. Fasteners 26 may include right angle projection threaded studs (also known as 90° anchor bolts or L-shaped bolts). Fasteners 28 may include flat headed threaded bolts.

Turning to FIGS. 6-10, each beam member 24 is preferably formed of a single rectangular, open-ended tube of a rigid material, such as steel, having a thickness, by way of example only, of 0.1875, 0.250, or 0.265 inch, though depending on the load to be carried, other thicknesses and materials, such as plastic or composite materials, can be suitable. Each beam member 24 includes a pair of sidewalls 30, 32, a bottom wall 34, and a top wall 36. The sidewalls 30, 32 and the bottom wall 34 of the beam member 24 define elongate opposing openings 38, 40. The elongate opposing openings 38, 40 each has a generally anvil-horn shaped profile. Heel ends 42 of the elongate opposing openings 38, 40 extend vertically from the bottom wall 34 of the beam member 24 and are spaced apart and separated from one another by a pair of laterally outwardly-open central opposing semi-cylindrical openings 44, 46 at a midpoint of the beam member 24. Each of the semi-cylindrical openings 44, 46 may have a crown-like top 45, similar in profile to a shouldered and flat-topped derby hat or resembling in profile that of a flat-topped cap nut, which can cooperate with the identically-shaped aperture 45 at the top of the opposite semi-cylindrical opening 46, 44 to retain a portion of a cable such as a power cable. Two pairs of additional, preferably circular, apertures 47, 48 are provided in the bottom of the beam member, with one such aperture 47 of each of the pairs 47, 48 provided below a toe region of a respective one of the elongate opposing openings 38, 40.

The sidewalls 30, 32 of each of the beam members 24 preferably includes mounting holes 50 therein. At least one such mounting hole 50 is preferably located in each sidewall portion between the vertical portions of the heel ends 42 of the elongate openings 38, 40 and the central semi-cylindrical openings 44, 46, just below an upper flat surface 52 of the elongate openings. Additional mounting holes 54 may be provided in each sidewall between the toe ends of the elongate openings 38, 40 and the respective open ends of the beam member 24.

Figure 11:
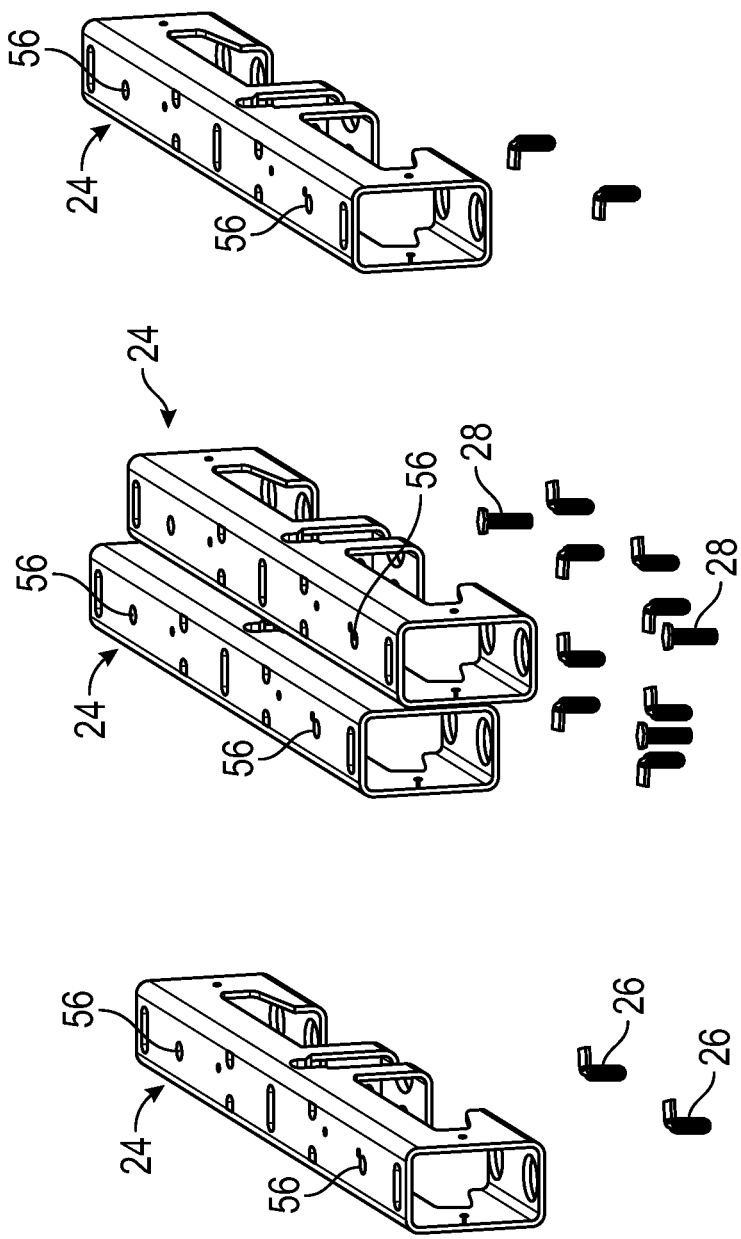
FIG. 11 is an exploded perspective view of an array of beam members with a plurality of fasteners to secure the beam members to an underside of the baseplate of FIG. 3.
Figure 12:
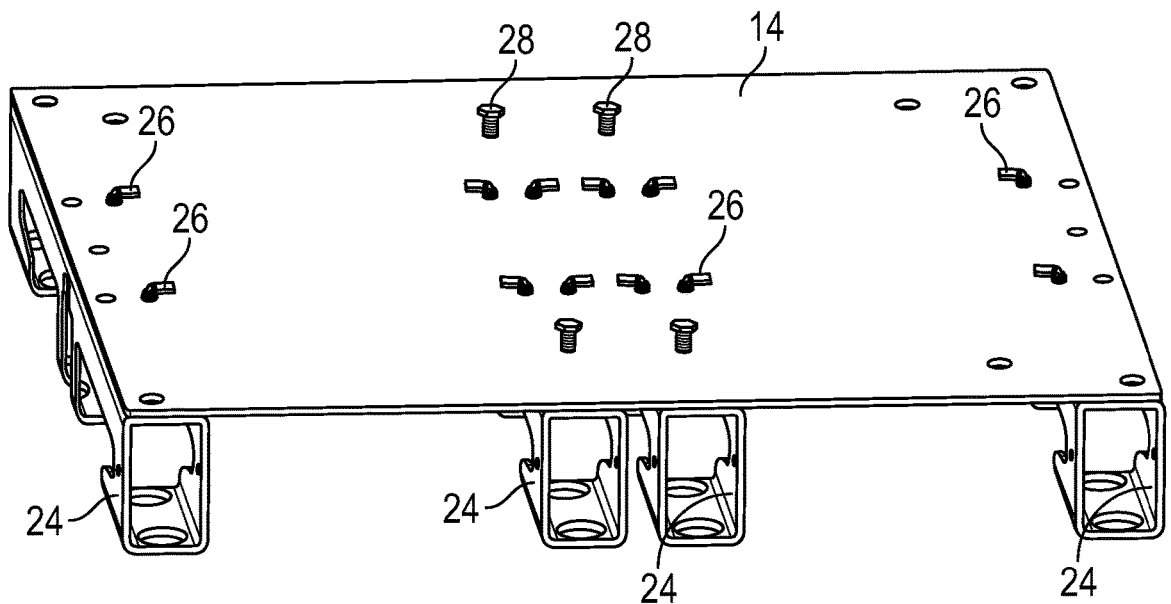
FIG. 12 is a top, right perspective view of the array of beam members of FIG. 11 secured to the baseplate of FIG. 3 with the fasteners of FIG. 11 to form a secure base of the present disclosure, with front, rear, left side, and right side kick plates removed.
Figure 13:
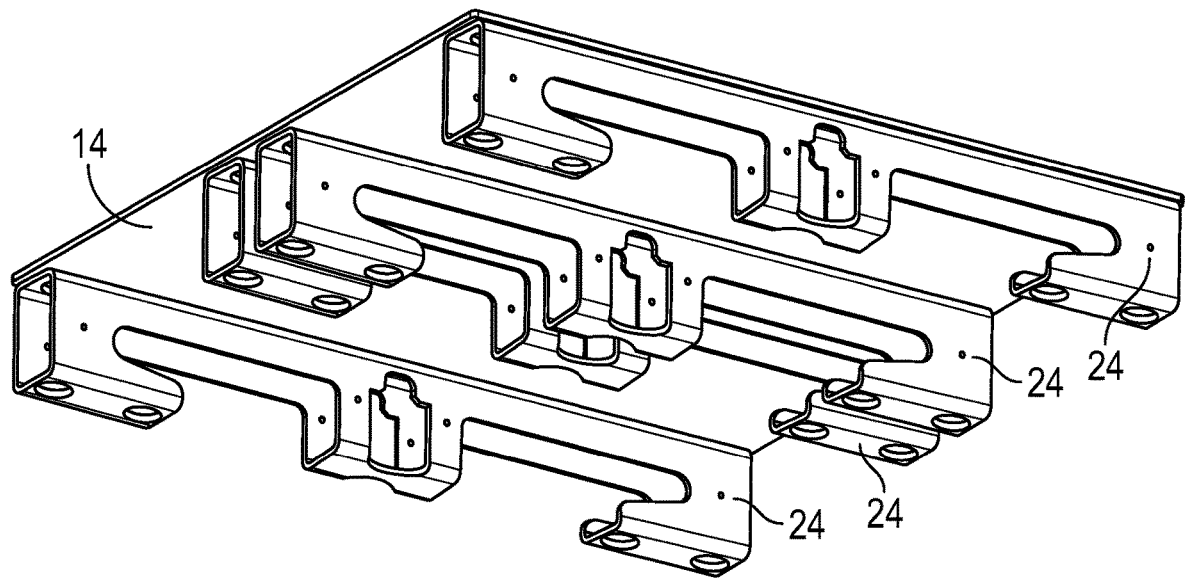
FIG. 13 is a bottom, front, left perspective view of the secure base of FIG. 12.

FIG. 11 illustrates an exploded array of four beam members 24 and a set of fasteners 26, 28 used to secure the beam members 24 to the underside of the baseplate (not shown in FIG. 11), through mounting holes 56 in the top wall 36 of each of the beam members 24. FIGS. 12 and 13 illustrate the array of four beam members 24 of FIG. 11 secured to the underside of baseplate 14 with fasteners 26, 28.

Figure 14:
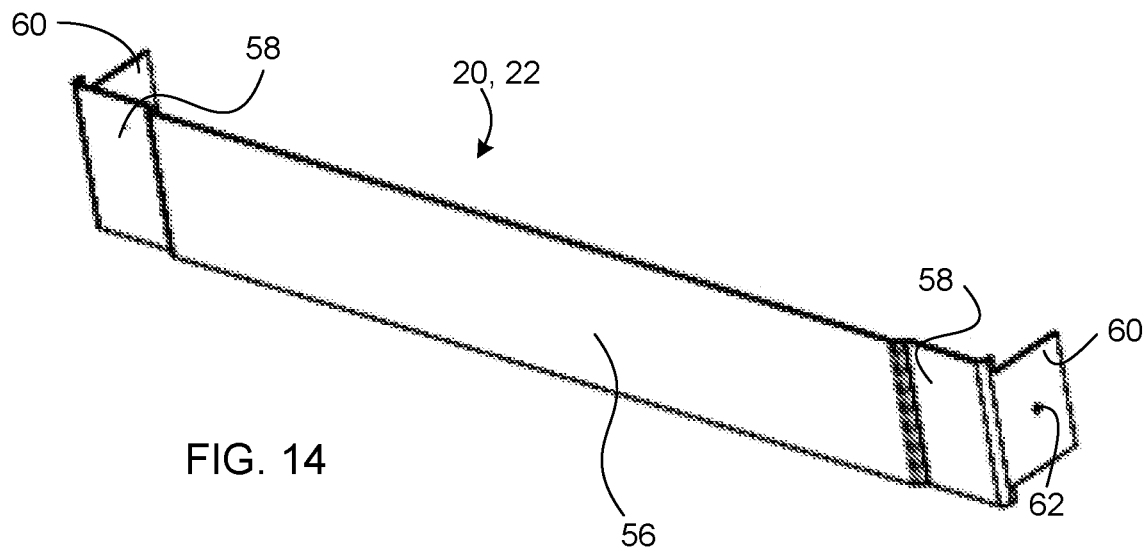
FIG. 14 is a top, front, right perspective view of a side kick plate of a secure base of the present disclosure.
Figure 15:
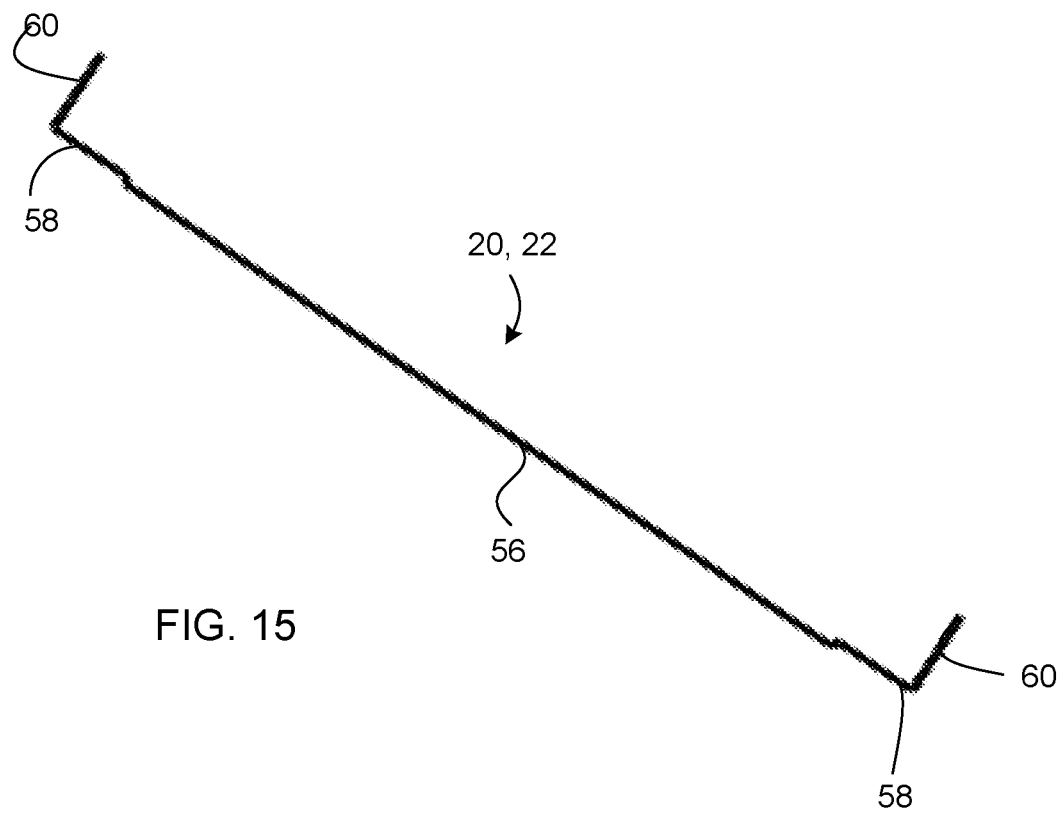
FIG. 15 is a top view of the side kick plate of FIG. 14, the bottom view being identical.

FIGS. 14 and 15 illustrate the identical side kick plates 20, 22, each of which includes a main wall 56, an inwardly-stepped tongue-receiving wall portion 58 at each end of the main wall that extends parallel to the main wall 56, and a pair of securement tabs 60, each being positioned at an end of, and perpendicular to, each of the tongue-receiving wall portions 58. Each of the securement tabs 60 may include a mounting hole 62 that is at a vertical position and spaced from the respective inwardly-stepped tongue-receiving wall portion 58 a distance so as to align with a corresponding mounting hole of one of the outer beam members 24.

Figure 16:
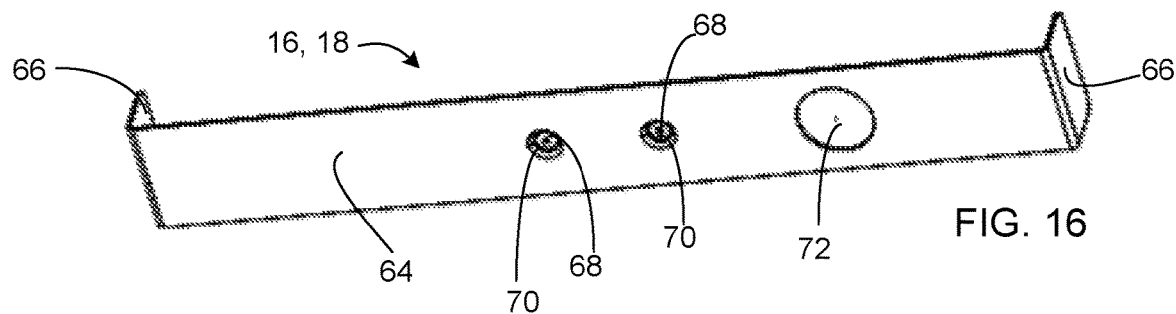
FIG. 16 is a top, front, right perspective view of a front or rear kick plate of a secure base of the present disclosure.
Figure 17:
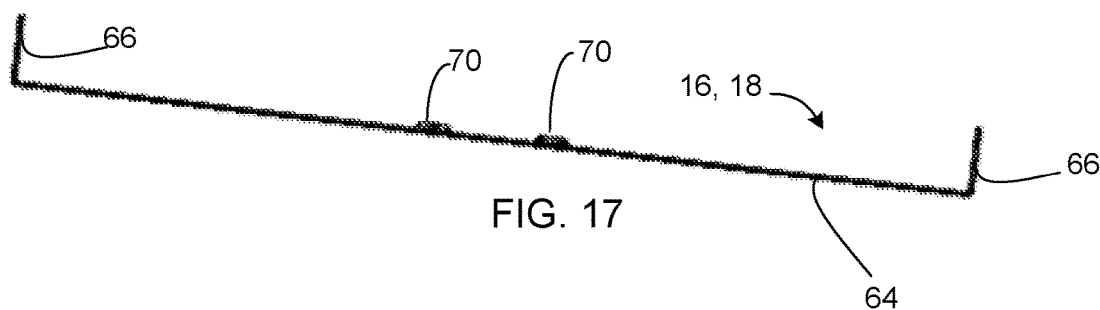
FIG. 17 is a top view of the front or rear kick plate of a secure base of FIG. 16, the bottom view being identical.
Figure 18:
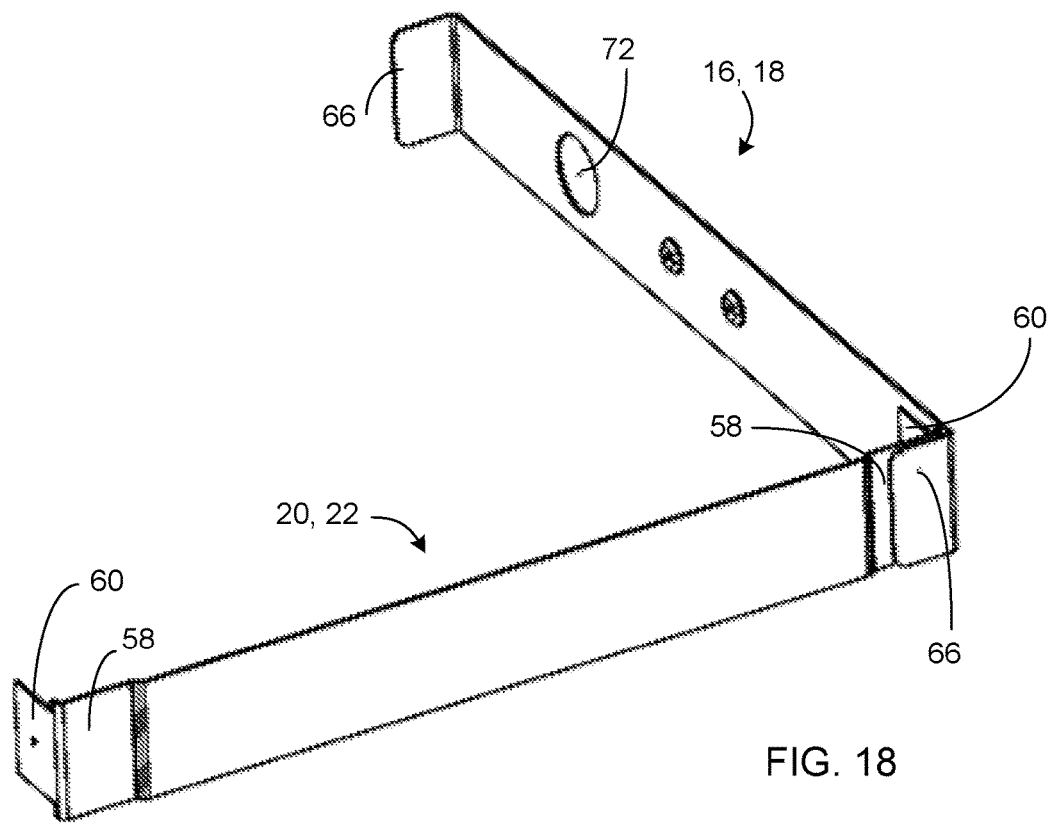
FIG. 18 is a top, left perspective view of a side kick plate of FIG. 14 and front or rear kick plate of FIG. 16 engaged with one another as they would be when secured to an array of beam members of a secure base of the present disclosure.

FIGS. 16 and 17 illustrate identical front and rear kick plates 16, 18, each of which includes a main wall 64 and tongues 66 at either end. The main wall 64 of each of the front and rear kick plates 16, 18 is preferably provided with a pair of mounting holes 68 centrally positioned in respective, preferably circular, countersunk regions 70. The main wall 64 of each of the front and rear kick plates 16, 18 is also provided with a knockout 72, which may be circular in shape, through which cables can pass into the secure base 12.

Figure 19:
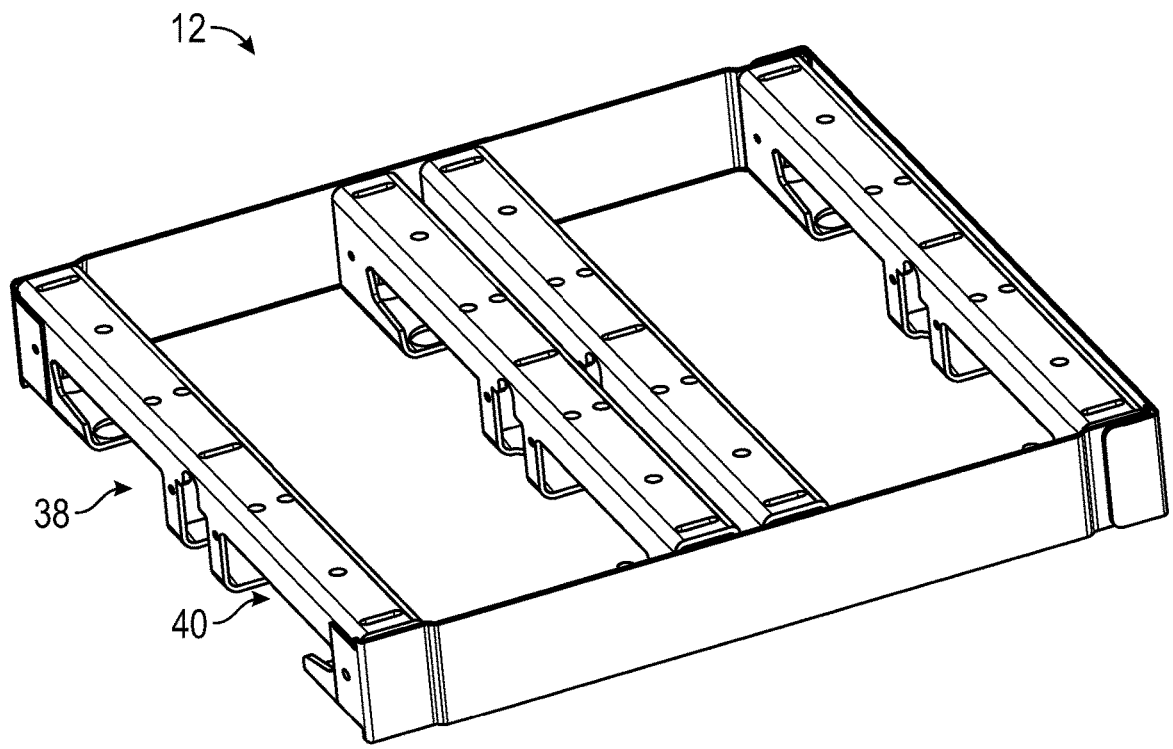
FIG. 19 is a top, front, right perspective view of a secure base of the present disclosure, with a front kick plate and baseplate removed.
Figure 20:
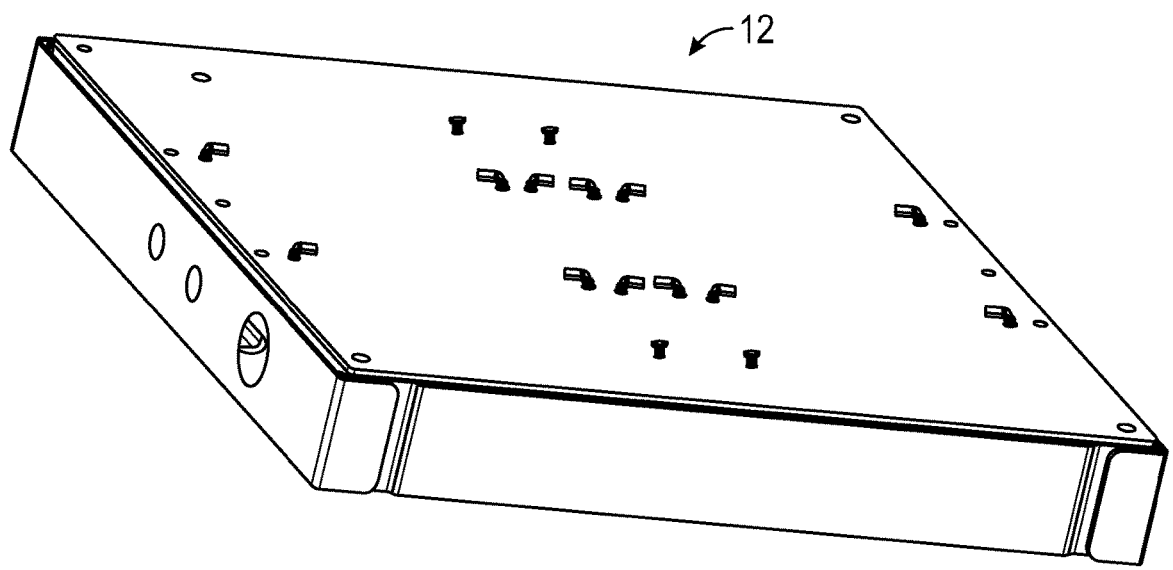
FIG. 20 is a top, front, right perspective view of a secure base of the present disclosure.
Figure 21:
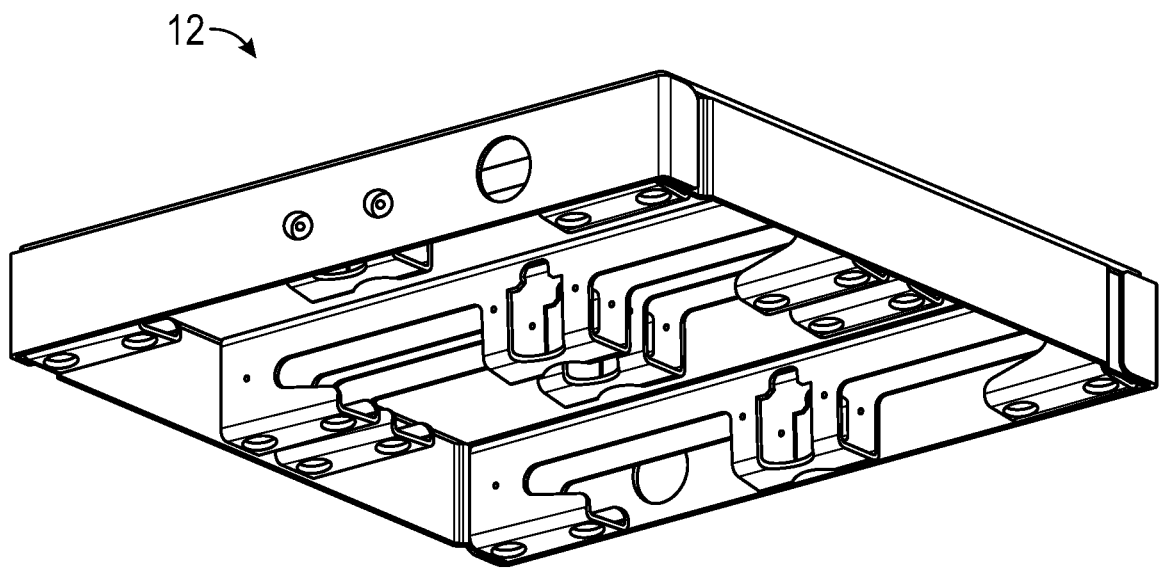
FIG. 21 is a bottom, front, right perspective view of the secure base of FIG. 20.

FIG. 19 illustrates a secure base 12 of the present disclosure, with a front kick plate 16 and a baseplate 14 removed, and FIGS. 20 and 21 illustrate fully assembled a secure base 12. As illustrated in FIG. 19, the elongate opposing openings 38, 40 of each of the beam members 24 align with one another to form a pair of channels through the secure base 12, which can (prior to installation, or upon removal, of the kick plates 16, 18, 20, 22) receive the blades of a forklift for relocating an electric vehicle charging station 10 mounted to the secure base 12. The orientation and spacing of the beam members 24 also permit blades of a forklift or a pallet jack to be received from either side of an electric vehicle charging station 10 mounted to the secure base 12, parallel to the beam members 24.

While certain embodiments have been described herein, it will be appreciated that variations can be made thereto that are still within the scope of the appended claims. For instance, while the embodiments disclosed herein are directed to a secure base for an electric vehicle charging station, the secure base of the appended claims can be utilized as a base for a variety of pumps, equipment enclosures, portable restrooms, or any application for which a pallet might be employed.

What is claimed is:

1. A base for supporting an electrical charging station, comprising:
   a baseplate; and
   a plurality of beam members secured, in a parallel arrangement to one another, to an underside of the baseplate, each beam member formed as an open-ended rectangular tubular member having a pair of side walls, a top wall, and a bottom wall, a pair of elongate opposing openings defined by the side walls and the bottom wall, the elongate opposing openings being generally anvil-horned in shape, and in each of the beam members, each of the elongate opposing openings including a heel end extending vertically from the bottom wall of the beam member toward the top portion of the beam member and being spaced and separated from the opposite elongate opening of the beam member by a pair of laterally outwardly-open central opposing semi-cylindrical openings in the bottom wall and the sidewalls of the beam member.

2. The base of claim 1, and in each of the beam members, each of the laterally outwardly-open central opposing semi-cylindrical openings includes a crown portion at a top thereof.

3. A base for supporting an electrical charging station, comprising:
   a baseplate;
   a plurality of beam members secured, in a parallel arrangement to one another, to an underside of the baseplate, each beam member formed as an open-ended rectangular tubular member having a pair of side walls, a top wall, and a bottom wall, a pair of elongate opposing openings defined by the side walls and the bottom wall, the elongate opposing openings being generally anvil-horned in shape, and
   a plurality of kick plates, each securable to a respective side of the base defined by the parallel arrangement of beam members secured to the baseplate, two of the plurality of kick plates including a main wall, an inwardly-stepped tongue-receiving wall portion at each end of the main wall that extends parallel to the main wall, and a pair of securement tabs, each of the securement tabs being positioned at an end of, and perpendicular to, each of the inwardly-stepped tongue-receiving wall portions.

4. The base of claim 3, and another two of the kick plates including a main wall and tongues at either end extending in a direction perpendicular to the main wall.

5. The base of claim 4, the two kick plates including the inwardly-stepped tongue-receiving wall portion at each end of the main wall being disposed on opposite sides of the base and the two kick plates including the tongues disposed on the remaining sides of the base, with the tongues received in a respective one of the inwardly-stepped tongue-receiving wall portions of the other two kick plates.

6. The base of claim 5, the two kick plates including the inwardly-stepped tongue-receiving wall portion received on the base in a direction perpendicular to the longitudinal orientation of the parallel arrangement of beam members, and the two kick plates including the tongues received on the base in a direction parallel to the longitudinal orientation of the parallel arrangement of beam members.

7. The base of claim 6, and the two kick plates including the tongues each including one or more mounting holes, each of which is aligned with a corresponding mounting hole in at least one of the sidewalls of a respective outermost one of the plurality of beam members, and a fastener extends through one of the at least one mounting holes of the kickplate and an aligned mounting hole in one of the sidewalls of the respective outermost one of the plurality of beam members.

8. The base of claim 7, and the two kick plates including the tongues each including one or more countersunk regions in the main wall, one of the one or more mounting holes of the kick plate being centrally disposed in a respective one of the one or more countersunk regions.

9. The base of claim 7, and at least one of the kick plates including a punch-out defining a cable pass-through.

* * * * *